US012146452B1

(12) United States Patent
Ness et al.

(10) Patent No.: US 12,146,452 B1
(45) Date of Patent: Nov. 19, 2024

(54) PISTON AND ENGINE SYSTEM USING SAME

(71) Applicant: Caterpillar Inc., Peoria, IL (US)

(72) Inventors: Aaron Ness, Battle Ground, IN (US); Andrew J. Loetz, West Lafayette, IN (US); Adam J. Clute, Lafayette, IN (US); Sri Harsha Uddanda, Cypress, TX (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 18/352,020

(22) Filed: Jul. 13, 2023

(51) Int. Cl.
*F02F 3/26* (2006.01)
*F02F 3/00* (2006.01)

(52) U.S. Cl.
CPC .............. *F02F 3/26* (2013.01); *F02F 3/0015* (2013.01)

(58) Field of Classification Search
CPC .. F02F 3/24; F02F 3/26; F02B 23/0672; F16J 1/00; F16J 1/09
See application file for complete search history.

(56) References Cited

U.S. PATENT DOCUMENTS 4,955,338 A 9/1990 Diwakar et al.
5,000,132 A 3/1991 Takashima
5,535,716 A 7/1996 Sato et al.
6,945,210 B2* 9/2005 Liu .................... F02B 23/0672 123/193.6
7,243,862 B2 7/2007 Dingle
9,284,879 B2* 3/2016 Dingreville ......... F02B 23/0672
9,429,101 B2* 8/2016 Nacke ........................ F02F 3/26
9,670,829 B2 6/2017 Böwing et al.
10,294,876 B2 5/2019 Laget et al.
10,400,663 B2* 9/2019 Ness .................. F02B 23/0672
10,815,871 B2 10/2020 Saad et al.
11,248,557 B1* 2/2022 Morgan ..................... F16J 1/09
2005/0166890 A1 8/2005 Wickman
2010/0108044 A1* 5/2010 Liu .................... F02B 23/0672 123/664
2011/0146613 A1* 6/2011 Oxborrow ............ F02B 23/063 123/193.6
2015/0053167 A1* 2/2015 Nacke ....................... F02F 3/26 123/193.6
2016/0169152 A1* 6/2016 Burger ...................... F02F 3/28 123/193.6

(Continued)

FOREIGN PATENT DOCUMENTS

EP 0775810 A1 5/1997
EP 2063081 B1 8/2016

(Continued)

*Primary Examiner* — Grant Moubry
*Assistant Examiner* — James G Moubry
(74) *Attorney, Agent, or Firm* — Brannon Sowers & Cracraft PC

(57) ABSTRACT

A piston for an internal combustion engine includes a piston skirt and a piston crown attached to the piston skirt. The piston crown includes a combustion face forming a piston rim extending circumferentially around a piston center axis, and a combustion bowl. The combustion face further forms a bowl edge defining an intersection of the combustion bowl and the piston rim, and includes a reentrant surface extending between the bowl edge and a bowl outer wall. A ratio of a bowl max dimension to a bowl opening dimension is from about 1.10 to about 1.15.

19 Claims, 2 Drawing Sheets

(56) References Cited

U.S. PATENT DOCUMENTS

2019/0186341 A1 * 6/2019 Ness .................. F02B 23/0621

FOREIGN PATENT DOCUMENTS

| | | | |
|---|---|---|---|
| FR | 2880385 | A1 | 7/2006 |
| IN | 201621045122 | A | 12/2019 |
| JP | H04128540 | A | 4/1992 |
| JP | 2001065350 | A | 3/2001 |

* cited by examiner

PISTON AND ENGINE SYSTEM USING SAME

TECHNICAL FIELD

The present disclosure relates generally to a piston for an internal combustion engine, and more particularly to a piston having combustion bowl surfaces configured for high efficiency operation.

BACKGROUND

Internal combustion engines are widely used throughout the world for purposes ranging from vehicle propulsion to operation of pumps and compressors, to generation of electrical power. Typical internal combustion engines employ a plurality of pistons that reciprocate in cylinder bores to rotate a crankshaft in response to a controlled combustion reaction, producing a rapid pressure and temperature rise to drive the pistons. For decades engineers have experimented with a wide variety of different fuels, various exhaust treatment apparatuses and technologies, and different operating strategies in efforts to improve engine operation, reliability, and performance.

In recent years research and development efforts have been increasingly directed at developing pistons optimized for various applications. Depending upon engine type, a piston is commonly formed with a specified combustion face geometry intended to interact with flows of fuel, air, and/or exhaust during operation to various ends including optimizing emissions and/or efficiency, to mitigate or otherwise control in-cylinder temperatures and/or mechanical wear or corrosion, and for various other purposes. It has been observed that seemingly quite minor changes to piston geometry can often have outsized effects upon engine operation and performance, and the results of varying any one parameter respecting piston geometry can often be quite unpredictable. Moreover, compounding the difficulties in optimizing piston design, the addition or removal of piston volume, particularly upon the combustion face, affects geometric compression ratio, oftentimes requiring other modifications to piston or overall engine system design to maintain compression ratio at a desired level. Depending upon fuel type and a great many different operating parameters and performance goals, optimized piston designs can have widely varying geometries. One known piston is set forth in U.S. Pat. No. 9,670,829 to Bowing et al.

SUMMARY

In one aspect, a piston for an internal combustion engine includes a piston skirt, and a piston crown attached to the piston skirt. The piston crown includes a combustion face forming a piston rim extending circumferentially around a piston center axis, and a combustion bowl having a bowl floor extending radially outward of the piston center axis to a bowl outer wall. The combustion face further forms a bowl edge defining an intersection of the combustion bowl and the piston rim, and includes a reentrant surface extending between the bowl edge and the bowl outer wall. The piston defines a bowl opening dimension at a first axial location of the bowl edge, and a bowl max dimension at a second axial location of the bowl outer wall. A ratio of the bowl max dimension to the bowl opening dimension is from about 1.10 to about 1.15.

In another aspect, a piston for an internal combustion engine includes a crown piece including a first axial end having a combustion face, a second axial end having an oil gallery surface, and an outer crown surface extending between the first axial end and the second axial end and having a plurality of ring grooves formed therein. The combustion face forms a piston rim extending circumferentially around a piston center axis, a combustion bowl having a bowl outer wall, a bowl floor, and a bowl edge defining an intersection of the piston rim and combustion bowl. The piston defines a bowl opening dimension at a first axial location of the bowl edge, and a bowl max dimension at a second axial location of the bowl outer wall. A ratio of the bowl max dimension to the bowl opening dimension is from about 1.10 to about 1.15.

In still another aspect, an internal combustion engine system includes an engine housing having a cylinder bore formed therein, an engine head, and a piston movable within the cylinder bore between a bottom-dead-center (BDC) position and a top-dead-center (TDC) position. The piston includes a piston crown having a combustion face forming a piston rim extending circumferentially around a piston center axis, and a reentrant combustion bowl. The piston defines a bowl opening dimension, and a bowl max dimension, and a ratio of the bowl max dimension to the bowl opening dimension is from about 1.10 to about 1.15.

DETAILED DESCRIPTION

Figure 1:
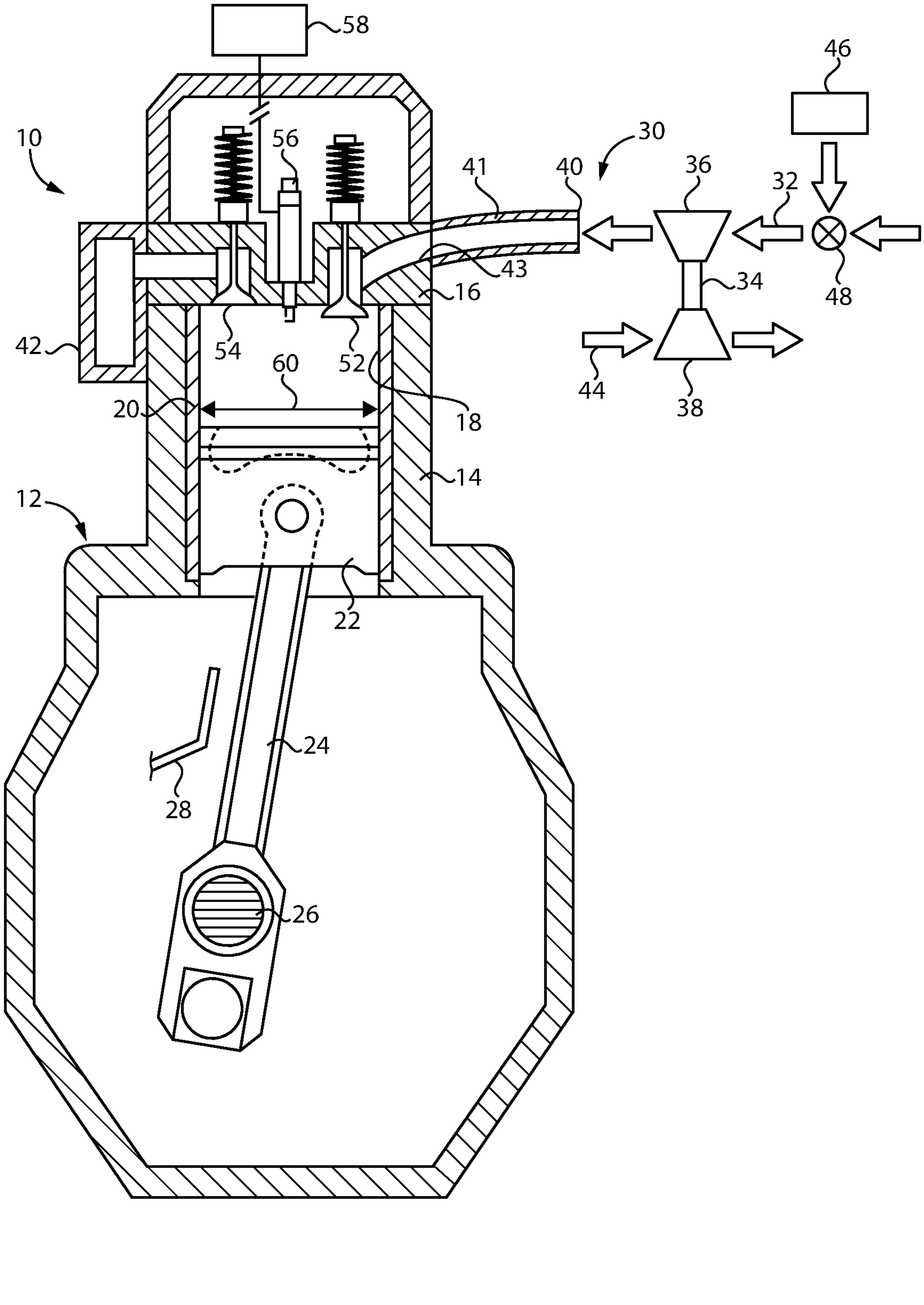
FIG. 1 is a diagrammatic view of an internal combustion engine system, according to one embodiment.

Referring to FIG. 1, there is shown an internal combustion engine system 10, according to one embodiment. Engine system 10 includes an internal combustion engine 12 having an engine housing or cylinder block 14, and an engine head 16 attached to cylinder block 14. A combustion cylinder 18 is formed in cylinder block 14 and may be one of a plurality of combustion cylinders formed therein. Although only a single cylinder and associated hardware is shown in FIG. 1, it will be appreciated that internal combustion engine system 10 will typically be a multi-cylinder engine and description and discussion herein of any one component of engine system 10 in the singular will be understood to refer by way of analogy to other like components of engine system 10. Combustion cylinders in cylinder block 14 may include any number in any suitable arrangement such as an in-line pattern, a V-pattern, or still another.

A cylinder liner 20 is positioned within cylinder block 14, and a piston 22 is movable in cylinder 18 between a bottom-dead-center (BDC) position and a top-dead-center (TDC) position in a generally conventional manner. Engine 12 will typically, but not necessarily, be configured to operate in a four-stroke engine cycle. Piston 22 is coupled to a connecting rod 24 in turn coupled to a crankshaft 26. An oil sprayer 28 may be oriented to spray cooling and lubricating oil onto an underside of piston 22 and into an oil gallery therein also in a generally conventional manner.

Engine system 10 also includes an intake system 30. Intake system 30 includes an intake conduit 32 structured to convey intake air for combustion to cylinder 18. Intake system 30 also includes an intake manifold 40 and an intake runner 41 extending from intake manifold 40 to an intake port 43 feeding cylinder 18. Those skilled in the art will appreciate an intake manifold would typically be coupled to a plurality of intake runners each extending to one of a plurality of cylinders. Engine system 10 also includes a turbocharger 34 having a compressor 36 positioned to pressurize an incoming flow of intake air in response to rotation of a turbine 38. Engine system 10 also includes an exhaust manifold 42 configured to receive a flow of exhaust from cylinder 18 and to convey the same by way of an exhaust conduit 44 to turbine 38.

Engine system 10 also includes a fuel admission valve 48 positioned to admit a flow of fuel from a fuel supply 46 to intake conduit 32. The illustrated arrangement will be recognized as a fumigated fuel admission arrangement. In other instances, engine system 10 might be port injected, including a fuel injection valve extending into or close to intake port 43, or manifold injected. It is contemplated engine system 10 will typically operate on a gaseous fuel, such as natural gas. Natural gas or other gaseous fuels might be supplied from a pressurized fuel tank, a gas line, from a mine, or various other sources. Engine system 10 may also be operated on various fuel blends including natural gas and gaseous molecular hydrogen, or various other gaseous hydrocarbon fuels and blends such as methane, ethane, biogas, landfill gas, or still others.

An intake valve 52 is shown supported in engine head 16 and movable to open or close fluid communications between intake port 43 and cylinder 18. An exhaust valve 54 analogously selectively fluidly connects cylinder 18 to exhaust manifold 42. In a typical application a total of two intake valves and a total of two exhaust valves might be provided for each cylinder in an engine. Engine system 10 may also be spark-ignited and includes a sparkplug 56 positioned to extend through engine head 16 into cylinder 18 to produce an electrical spark for igniting a mixture of fuel and air in cylinder 18. Sparkplug 56 may be electrically connected to an electronic control unit 58 or another suitable electrical or magnetic device for generating a spark at a spark gap in cylinder 18. Still other implementations could employ a prechamber sparkplug providing a prechamber within or fluidly connected to cylinder 18 for igniting a prechamber charge that ignites a main charge of a fuel and air in cylinder 18 according to well-known principles.

Figure 2:
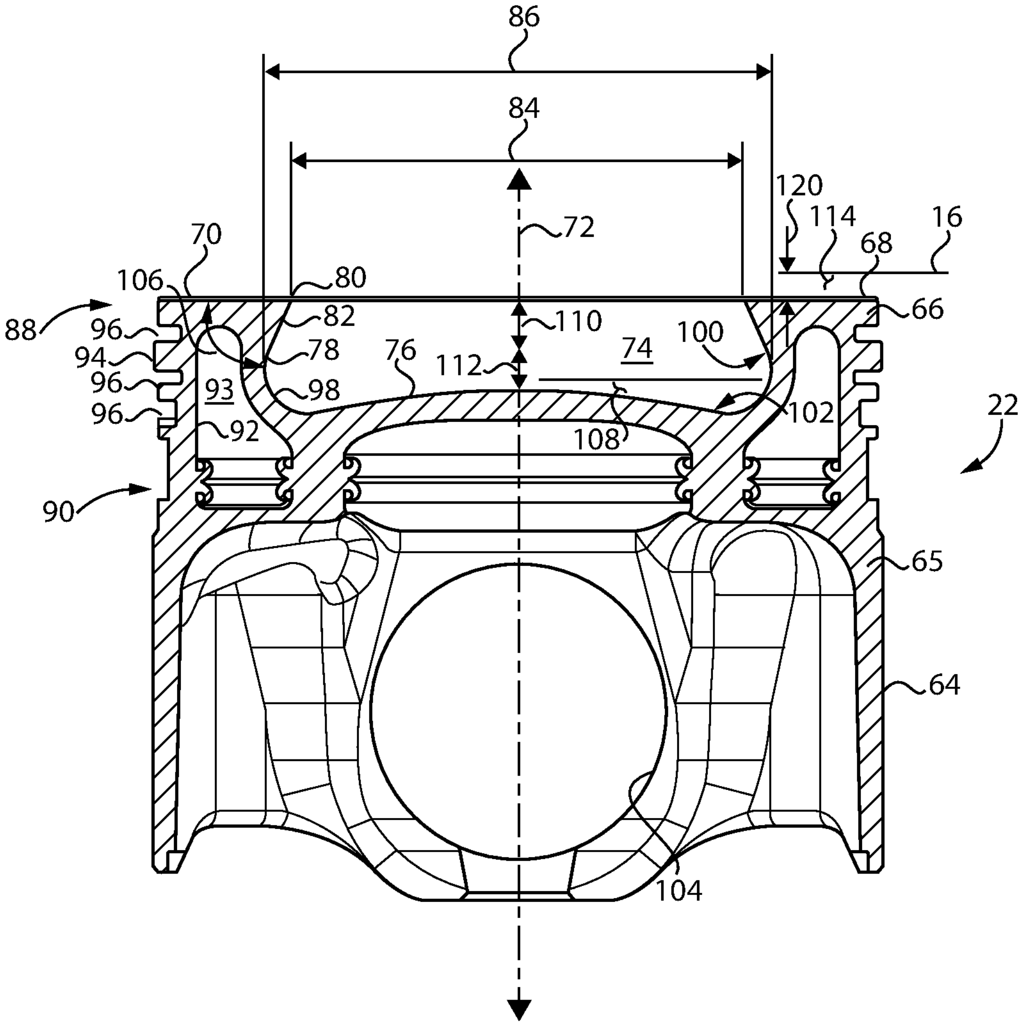
FIG. 2 is a sectioned side diagrammatic view of a piston, according to one embodiment.

Referring also now to FIG. 2, there are shown features of piston 22 in further detail. Piston 22 includes a piston skirt 64 formed on a piston skirt piece 65, and a piston crown 66 or crown piece (hereinafter "piston crown 66) attached to piston skirt 64. Piston crown 66 includes a combustion face 68 forming a piston rim extending circumferentially around a piston center axis 72, and a combustion bowl 74. Combustion bowl 74 includes a bowl floor 76 extending radially outward of piston center axis 72 to a bowl outer wall 78. Piston crown 66 further includes a first axial end 88 that includes combustion face 68, and a second axial end 90 having an oil gallery surface 92. Oil gallery surface 92 forms an oil gallery 93 located in part within skirt piece 65 and in part within piston crown 66, radially outward of combustion bowl 74 and extending circumferentially around piston center axis 72. Piston crown 66 further includes an outer crown surface 94 extending between first axial end 88 and second axial end 90 and having a plurality of piston ring grooves 96 formed therein and extending circumferentially around piston center axis 72.

Combustion bowl 74 includes a bowl floor 76 extending radially outward of piston center axis 72 to a bowl outer wall 78. Bowl outer wall 78 may include an arcuate surface 98. Combustion face 68 further forms a bowl edge 80 defining an intersection of combustion bowl 74 and piston rim 70, and includes a reentrant surface 82 extending between bowl edge 80 and bowl outer wall 78. In a practical implementation, reentrant surface 82 extends from bowl edge 80 to bowl outer wall 78, and reentrant surface 82 and oil gallery 93 may be at least partially overlapping in axial extent. Reentrant surface 82 may include a conical reentrant surface extending from bowl edge 84 to a first blend 100 with bowl outer wall 78 at a first blend axial location. Bowl outer wall 78 may extend from the first blend 100 to a second blend 102 with bowl floor 76 at a second blend axial location.

Also in the illustrated embodiment bowl floor 76 is convex to combustion bowl 74, bowl outer wall 78 is concave to combustion bowl 74, and piston rim 70 is planar. Bowl outer wall 78 may define a total of one radius of curvature between bowl floor 76 and reentrant surface 82. The radius of curvature defined by bowl outer wall 78 may be about 10 millimeters in some embodiments. FIG. 2 further illustrates a wrist pin bore 104 formed in piston skirt 64 and structured to receive a wrist pin in a generally conventional manner. Piston crown 66 and piston skirt 64 may include separate pieces formed, for example, by a friction welding process such as inertia welding, although the present disclosure is not thereby limited. Piston 22 may be formed throughout from steel or another iron-containing material, or in some embodiments of aluminum.

Piston 22 further defines a bowl opening dimension 84 at a first axial location of bowl edge 80, and a bowl max (maximum) dimension 86 at a second axial location of bowl outer wall 78. A ratio of bowl max dimension 86 to bowl opening dimension 84 may be from about 1.10 to about 1.15. In a refinement, the ratio of bowl max dimension 86 to bowl opening dimension 84 may be from about 1.11 to about 1.13, and more particularly about 1.12. In a practical implementation strategy, bowl max dimension 86 may be about 119 millimeters, and bowl opening dimension 84 may be about 106 millimeters.

As noted above, bowl opening dimension 84 is defined at a first axial location of bowl edge 80. Piston rim 70 may extend planarly from outer surface 94 to bowl edge 80 such that piston rim 70 terminates radially inward at bowl edge 80 and defines a rim plane normal to piston center axis 72 at the first axial location, the rim plane including bowl opening dimension 84. A first depth dimension 110 coincident with piston center axis 72 is defined between the rim plane and the axial location of blend 100. A second depth dimension 112 coincident with piston center axis 72 is defined between the axial location of blend 100 and bowl floor 76. First depth dimension 110 may be greater than second depth dimension 112. Put differently, blend 100 may be closer to an axially uppermost point of bowl floor than to the rim plane.

It will further be recalled bowl max dimension 86 is defined at a radially outermost extremity of bowl outer wall 78. A clearance 108 coincident with piston center axis-72, but shown radially offset from piston center axis in FIG. 2 for clarity, is defined between the second axial location of the bowl outer wall 78 where bowl max dimension 86 is defined and bowl floor 76. Put differently, bowl floor 76 while typically convex is spaced axially below an axial location where combustion bowl 74 is widest.

In FIG. 2 piston 22 is shown as it might appear at the TDC position close to engine head 16. A clearance distance 120 is defined between piston rim 70 and engine head 16 and in a practical application may be about 4 millimeters. A clearance volume 114 is defined between combustion face 68 and engine head 16. In an embodiment, clearance volume 114 may be about 356 cubic centimeters. A combustion bowl volume may be about 252 cubic centimeters. As noted above, combustion face 68 defines bowl opening dimension 84. A bowl opening area of a circle having as a diameter bowl opening dimension 84 may be about 88 square centimeters. A ratio of the bowl opening area to a clearance area defined as a sum of the bowl opening area and a piston rim area defined by piston rim 70 may be from about 0.38 to about 0.45. In a refinement, the ratio of the bowl opening area to the clearance area may be about 0.39. A similar ratio range may exist between the bowl opening area and a cross-sectional bore area of cylinder bore 18, albeit cylinder bore 18 may be slightly larger in cross sectional area than the sum of the bowl opening area and the piston rim area. In FIG. 1, a cylinder bore diameter is shown at numeral 60. FIG. 2 also illustrates a reentrancy angle 106 defined between piston rim 70 and reentrant surface 82. Reentrancy angle 106 may be about 70 degrees or less, and in a refinement is about 67 degrees.

INDUSTRIAL APPLICABILITY

It has been observed that turbulence in the flow of fluids within a combustion cylinder in certain engine designs and operating strategies can be associated with performance improvements. In the case of engine system 10 utilizing piston 22, the relatively small clearance distance between the piston top surface (piston rim 68) coupled with the relative large radial width of the rim resulting at least in part from the combustion bowl maximum diameter to opening diameter provides a rapid "squish" velocity. Explained another way, the relatively wide but shallow clearance provides for enhanced acceleration of the gases over what might be observed with a relatively larger clearance distance and/or a narrower piston rim. During service, and at the TDC position, the rapidly squished fuel and air tumbles over bowl edge 80 and flows turbulently in combustion bowl 74. In cooperation with some or all of the other parameters of piston 22 discussed herein depending upon the particular embodiment, the phenomenon described can be expected to promote faster flame speed and high combustion efficiency. These properties are also implemented without geometric changes that undesirably disturb the relatively high geometric compression ratio of engine system 10 which may in some embodiments be greater than 14 to 1, such as about 14.7 to 1.

Certain dimensions and proportions are described herein using the term "about." The term "about" can be understood to mean generally or approximately as would be understood by a person skilled in the engine and piston design field, such as by way of approximation, convention, or conventional rounding to a consistent number of significant digits. According to the latter of these, "about 0.3" is understood to mean from 0.25 to 0.34. "About 0.32" means from 0.315 to 0.324, and so on. A dimension or proportion listed without a preceding relative term can be understood to mean the dimension or proportion within measurement error.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A piston for an internal combustion engine comprising:
- a piston skirt;
- a piston crown attached to the piston skirt, and including a combustion face forming a piston rim extending circumferentially around a piston center axis, and a combustion bowl having a bowl floor extending radially outward of the piston center axis to a bowl outer wall;
- the combustion face further forming a bowl edge defining an intersection of the combustion bowl and the piston rim, and including a reentrant surface extending between the bowl edge and the bowl outer wall;
- the piston defining a bowl opening dimension at a first axial location of the bowl edge, and a bowl max dimension at a second axial location of the bowl outer wall; and
- a ratio of the bowl max dimension to the bowl opening dimension is from about 1.10 to about 1.15;
- wherein a clearance distance coincident with the piston center axis is defined between the second axial location and the bowl floor.

2. The piston of claim 1 wherein the ratio is from about 1.11 to about 1.13.

3. The piston of claim 2 wherein the bowl max dimension is about 119 millimeters, and the bowl opening dimension is about 106 millimeters.

4. The piston of claim 1 wherein the bowl floor is convex to the combustion bowl, the bowl outer wall is concave to the combustion bowl, and the piston rim is planar.

5. The piston of claim 1 wherein:
- an oil gallery is formed radially outward of the combustion bowl and extends circumferentially around the piston center axis; and
- the reentrant surface and the oil gallery overlap in axial extent.

6. The piston of claim 5 wherein the reentrant surface is conical, and the bowl outer wall defines a total of one radius of curvature between the bowl floor and the reentrant surface.

7. The piston of claim 6 wherein a reentrancy angle of about 70 degrees or less is defined between the reentrant surface and the piston rim, and the total of one radius of curvature is about 10 millimeters.

8. The piston of claim 1 wherein the combustion face defines a bowl opening area, and a piston rim area, and a ratio of the bowl opening area to a clearance area defined as a sum of the bowl opening area and the piston rim area is from about 0.38 to about 0.45.

9. The piston of claim 8 wherein the ratio of the bowl opening area to the clearance area is about 0.39.

10. A piston for an internal combustion engine comprising:
- a crown piece including a first axial end having a combustion face, a second axial end having an oil gallery surface, and an outer crown surface extending between the first axial end and the second axial end and having a plurality of ring grooves formed therein;
- the combustion face forming a piston rim extending circumferentially around a piston center axis, a combustion bowl having a bowl outer wall, a bowl floor, and a bowl edge defining an intersection of the piston rim and the combustion bowl;

the piston defining a bowl opening dimension at a first axial location of the bowl edge, and a bowl max dimension at a second axial location of the bowl outer wall;

the piston rim defining a rim plane normal to the center axis at the first axial location;

the bowl opening dimension is defined at a radially innermost location of the bowl edge; and a ratio of the bowl max dimension to the bowl opening dimension is from about 1.10 to about 1.15;

wherein a clearance distance coincident with the piston center axis is defined between the second axial location and the bowl floor such that the bowl floor is spaced axially below the second axial location.

11. The piston of claim 10 wherein the combustion face further includes a conical reentrant surface extending from the bowl edge to a blend with the bowl outer wall that is located axially between the first axial location of the bowl edge and the second axial location of the bowl outer wall.

12. The piston of claim 11 wherein:

a rim plane normal to the piston center axis is defined by the piston rim and includes the bowl opening dimension;

a first depth dimension coincident with the piston center axis is defined between the rim plane and an axial location of the blend;

a second depth dimension coincident with the piston center axis is defined between the axial location of the blend and the bowl floor; and the first depth dimension is greater than the second depth dimension.

13. The piston of claim 11 wherein the conical reentrant surface and the oil gallery surface are overlapping in axial extent.

14. The piston of claim 10 wherein the ratio is about 1.12.

15. The piston of claim 10 wherein the combustion face defines a bowl opening area, and a piston rim area, and a ratio of the bowl opening area to a clearance area defined as a sum of the bowl opening area and the piston rim area is from about 0.38 to about 0.45.

16. An internal combustion engine system comprising:

an engine housing having a cylinder bore formed therein;

an engine head;

a piston movable within the cylinder bore between a bottom-dead-center (BDC) position and a top-dead-center (TDC) position;

the piston including a piston crown having a combustion face forming a piston rim extending circumferentially around a piston center axis, and a reentrant combustion bowl; and the piston defining a bowl opening dimension, and a bowl max dimension, and a ratio of the bowl max dimension to the bowl opening dimension is from about 1.10 to about 1.15;

wherein a clearance distance coincident with the piston center axis is defined between the second axial location and the bowl floor.

17. The internal combustion engine system of claim 16 wherein a clearance volume is defined between the combustion face and the engine head, and a ratio of a combustion bowl volume to the clearance volume is about 0.71.

18. The internal combustion engine system of claim 16 wherein a ratio of a combustion bowl opening area to a bore area of the cylinder bore is about 0.39.

19. The internal combustion engine system of claim 16 wherein:

the combustion face further includes a conical reentrant surface extending from the bowl edge to a blend with the bowl outer wall that is located axially between the first axial location of the bowl edge and the second axial location of the bowl outer wall;

a rim plane normal to the piston center axis is defined by the piston rim and includes the bowl opening dimension;

a first depth dimension coincident with the piston center axis is defined between the rim plane and an axial location of the blend;

a second depth dimension coincident with the piston center axis is defined between the axial location of the blend and the bowl floor; and the first depth dimension is greater than the second depth dimension.

* * * * *